United States Patent [19]
Jacuzio

[11] Patent Number: 6,070,168
[45] Date of Patent: May 30, 2000

[54] PLATFORM-INDEPENDENT OBJECT MEMORY MANAGER

[75] Inventor: Jerry J. Jacuzio, Pittsboro, N.C.

[73] Assignee: Nortel Networks Corporation, Canada

[21] Appl. No.: 09/001,919

[22] Filed: Dec. 31, 1997

[51] Int. Cl.[7] ................................................ G06F 17/30
[52] U.S. Cl. ............................................. 707/103; 707/10
[58] Field of Search ................................... 395/685, 700, 395/650; 707/206, 9, 10, 103; 364/514; 235/375

[56] References Cited

U.S. PATENT DOCUMENTS

| | | | |
|---|---|---|---|
| 5,189,733 | 2/1993 | Bennett et al. | 711/170 |
| 5,206,951 | 4/1993 | Khoyi et al. | 395/650 |
| 5,247,669 | 9/1993 | Abraham et al. | 707/103 |
| 5,261,098 | 11/1993 | Katin et al. | 395/650 |
| 5,361,349 | 11/1994 | Sugita et al. | 707/104 |
| 5,361,350 | 11/1994 | Conner et al. | 707/103 |
| 5,367,148 | 11/1994 | Storch et al. | 235/375 |
| 5,369,778 | 11/1994 | San Soucie et al. | 395/800 |
| 5,392,432 | 2/1995 | Engelstad et al. | 707/103 |
| 5,396,614 | 3/1995 | Khalidi et al. | 711/118 |
| 5,423,042 | 6/1995 | Jalili et al. | 395/700 |
| 5,426,747 | 6/1995 | Weinreb et al. | 711/203 |
| 5,455,854 | 10/1995 | Dilts et al. | 379/201 |
| 5,465,351 | 11/1995 | Lemmo | 707/10 |
| 5,526,519 | 6/1996 | Maruyama et al. | 707/103 |
| 5,553,267 | 9/1996 | Herlihy | 711/147 |
| 5,566,302 | 10/1996 | Khalidi et al. | 395/680 |
| 5,634,124 | 5/1997 | Khoyi et al. | 707/103 |
| 5,696,697 | 12/1997 | Blau et al. | 364/514 |
| 5,761,499 | 6/1998 | Sonderegger | 707/10 |
| 5,765,153 | 6/1998 | Benantar et al. | 707/9 |
| 5,799,185 | 8/1998 | Watanabe | 707/206 |
| 5,802,367 | 9/1998 | Held et al. | 395/685 |

*Primary Examiner*—Thomas G. Black
*Assistant Examiner*—Frantz Coby
*Attorney, Agent, or Firm*—Finnegan, Henderson, Farabow, Garrett & Dunner, L.L.P.

[57] ABSTRACT

Methods and systems consistent with the invention provide an interface between a client application and a central server memory that enables efficient and reliable processing of objects. The system receives registration information from the client application that describes objects of a class type of the client application. The system then allocates memory to the class type according to the received registration information received and manages objects of the class type using the allocated memory.

72 Claims, 5 Drawing Sheets

```
RegisterWithServices(ObjsNum, ObjSize, ORegStatus, UtilityMethodsAddr)
RegisterWithoutServices(ObjsNum, ObjSize, ORegStatus)
```
— 210

```
Public class MyClass {

ServiceCallRequest(omm_id)    /* Requests instantiation of an object of MyClass */ static int omm_id                                /* Placeholder for OMM identification number */
    static void UtilityMethods(int, void*, UtilityStruct*)  /*Link to OMM System */

/*   Class Instructions   */
}
```
— 220, 222, 224, 226

PLATFORM-INDEPENDENT OBJECT MEMORY MANAGER

BACKGROUND OF THE INVENTION

A. Field of the Invention

The present invention relates to methods and systems for managing memory, and, more particularly, for managing objects instantiated in memory.

B. Description of the Related Art

An object-oriented program controlled system, at its basic level, concerns objects, messages, and the interaction between the two. Objects typically include two types of data: private data and public data. Private data is used by the object alone, while public data is shared data accessed through the object's service interface. The objects send messages to each other to execute processes in the object-oriented program controlled system. Objects may send messages by invoking the object's member functions included in the object's service interface.

Objects are long-lived, as compared to messages, and require space in memory. Typical object-oriented program controlled systems allocate the memory required for each object at the time of creation of the object. However, since such systems create objects frequently for each new or different required functionality, the system must conserve memory space. If the memory resources become totally exhausted, further processing will be impossible. Object-oriented program controlled systems typically use a memory manager to help conserve memory space during processing.

Traditional memory managers require client applications to specify the amount of memory that they will need for a given processing procedure. The memory manager then allocates an amount of raw memory to each client application and provides the client application with the address of the client application's allocated memory block. In this way, the memory manager provides protection against another application overrunning the client application's allocated memory block. While this may be satisfactory for conventional procedural program systems, a more robust system is needed for object-oriented program controlled systems. In particular, it is desirable to have a memory management system that manages the objects as well as the system memory.

SUMMARY OF THE INVENTION

Systems and methods consistent with the present invention are platform-independent and provide a robust service interface for managing objects and memory resources for instantiating objects.

To achieve these and other advantages, an object memory manager systems consistent with the present invention communicates with a client application. The system includes means for receiving registration information from the client application that describes objects of a class type of the client application. The system further includes means for allocating memory to the class type according to the registration information received from the client application. Finally, the system includes means for managing objects of the class type using the allocated memory.

In another aspect, the invention includes a method for managing an object memory for a client application. The method includes the steps of receiving registration information from the client application that describes objects of a class type of the client application. Memory is then allocated to the class type according to the registration information received from the client application. The method then includes the step of managing objects of the class type using the allocated memory.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention.

In the drawings:

FIG. 2 is a diagram illustrating the software entities of client application 200;

DETAILED DESCRIPTION

Overview

Object Memory Manager (OMM) systems consistent with the present invention provide an interface between clients and a central server memory that enables efficient and reliable processing of objects. The term "object" refers to an instantiation of a class type, programmed using any object-oriented programming language, such as C++ or Smalltalk. Clients must register the class types with the OMM system to use the OMM system's object management services. During registration, clients provide registration information describing the objects of the class type. The OMM system uses this registration information to manage the memory storing the objects of those class types.

Clients may register with the OMM system in one of two ways. Under the first type of registration, clients request that the OMM system allocate a block of general system memory to the client. The OMM system will then give the client access to the general system memory, but will not allow the client to use the OMM system's object management services. The second type of registration allows clients to request that the OMM system allocate a block of an object memory for the use of objects of the registering class type. When clients request use of the object memory, the OMM system will give the client access to the object management services.

System Organization

Figure 1:
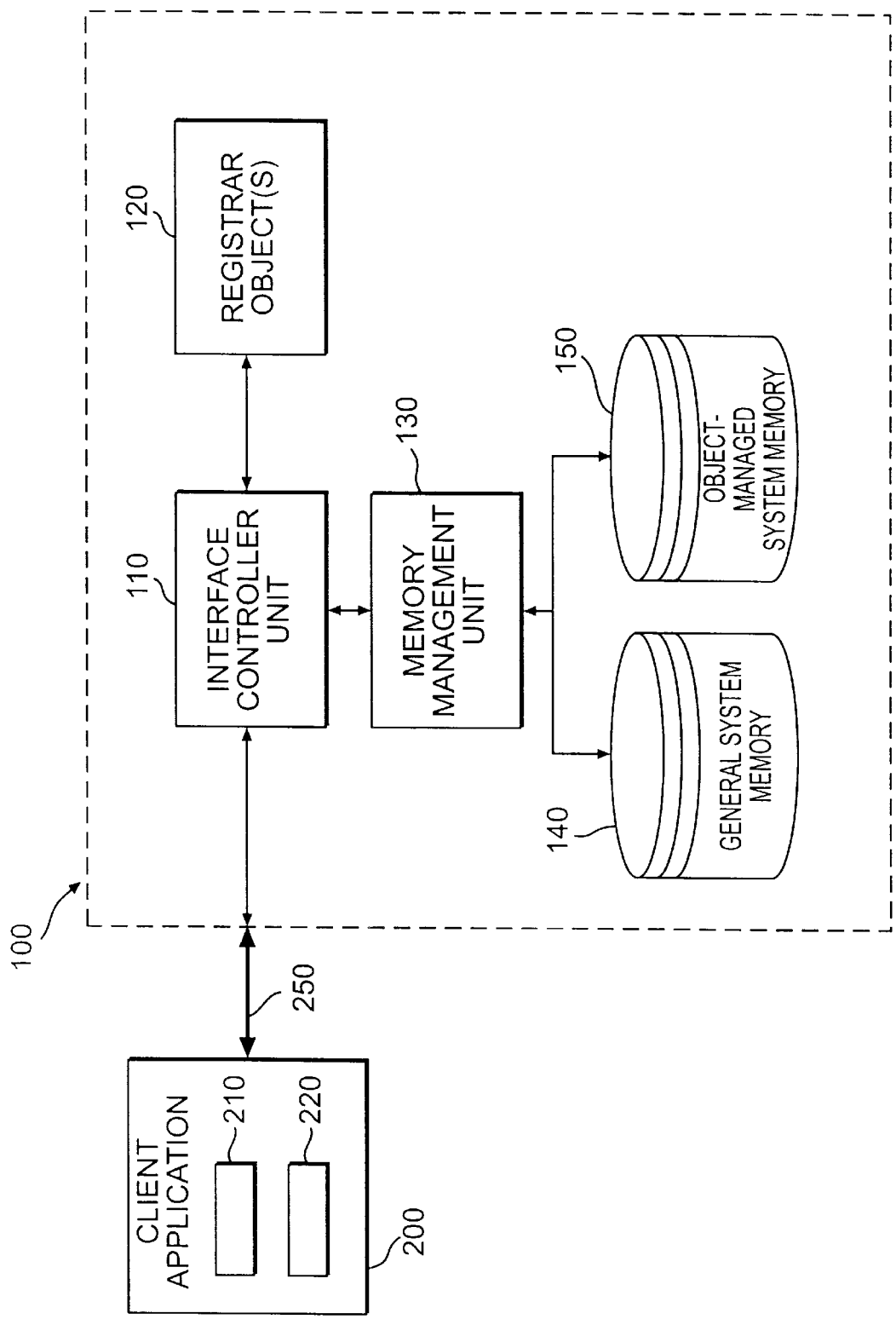
FIG. 1 is a block diagram of an object memory manager (OMM) system 100 consistent with the present invention.

FIG. 1 illustrates an OMM system 100 consistent with the present invention. As shown in FIG. 1, OMM system 100 includes an interface controller unit 110, registrar objects 120, a memory management unit 130, a general system memory 140, and an object-managed system memory 150. OMM system 100 communicates with a client application 200 over a network 250 and provides an interface for system memories 140 and 150. OMM system 100 and client application 200 are computer programs written in an appropriate object-oriented programming language, such as C++ or Smalltalk, and residing on the same computer station supporting OMM system 100 or on separate computer stations connected through network 250. Although FIG. 1 shows only one client application 200, OMM system 100 preferably manages objects for several client applications 200. Further, although memories 140 and 150 are shown as two separate memories, memories 140 and 150 may be parts of the same memory, such as the ROM system memory of the computer station supporting OMM system 100.

Client application 200 further includes a registration call request 210 and a class type 220. Registration call request 210 sends a message to interface controller unit 110 requesting that interface controller unit 110 register class type 220. Registration call request 210 may request interface controller unit 110 to register class type 220 for use with either general system memory 140 or object-managed system memory 150. When client application 200 registers to use object-managed system memory 150, OMM system 100 gives client application 200 access to the object management services to manage the objects of class type 220.

Interface controller unit 110 receives the registration call request 210 and instantiates a registrar object 120 that corresponds to class type 220. Interface controller unit 110 initializes registrar object 120 with registration information describing the objects of class type 220. Memory management unit 130 uses the registration information of registrar object 120 to perform the object management services for client application 200. The object management services offered by OMM system 100 include: (1) releasing an object of class type 220 from use; (2) obtaining the address of an object of class type 220 available for use; (3) validating the memory address of an object of class type 220 instantiated in object-managed system memory 150; (4) listing the objects of class type 220 currently in use; (5) obtaining an instance number of an object of class type 220 based on the address in object-managed system memory 150 for that object; and (6) obtaining the address in object-managed system memory 150 of an object of class type 220 based on the instance number of that object.

FIG. 2 is a diagram illustrating the software entities of client application 200. As shown in FIG. 2, client application 200 includes registration call request 210 and class type 220. Although FIG. 2 shows two types of registration function calls, registration call request 210 calls either the RegisterWithoutServices function or the RegisterWithServices function of interface controller unit 110. When registration call request 210 calls the RegisterWithoutServices function, interface controller unit 110 registers class type 220 for use of general system memory 140. In this case, interface controller unit 110 does not give client application 200 access to the object management services of OMM system 100, but will simply allocate a block of general system memory 140 to class type 220. If registration call request 210 calls the RegisterWithServices function, on the other hand, interface controller unit 110 allocates a block of object-managed system memory 150 for the use of class type 220. Unlike the use of general system memory 140, use of object-managed system memory 150 includes use of the object management services of OMM system 100.

Class type 220 further includes a service call request 222, an ID placeholder 224 and a UtilityMethods member function 226. Service call request 222 calls an object management service of memory management unit 130. Although FIG. 2 shows service call request 222 located in class type 220, service call request 222 may be executed by client application 200 as well. In systems consistent with the invention, service call request 222 must include an OMM identification number recognized by memory management unit 130. Interface controlling unit 110 assigns each class type 220 an OMM identification number during registration, and ID placeholder 224 holds the OMM identification number for later use by class type 220.

UtilityMethods member function 226 provides client application 200 with the ability to communicate with objects managed by OMM system 100. To this end, registrar object 120 stores the address of UtilityMethods member function 226, thereby creating a conduit through which data may be passed between client application 200 and OMM system 100. UtilityMethods member function 226 includes as arguments the address of an object of class type 220, an input value for that object, and the address of a payload structure. Client application 200 can then use the payload structure to pass data to and from an object of class type 220 instantiated in object-managed memory 150.

Figure 3:
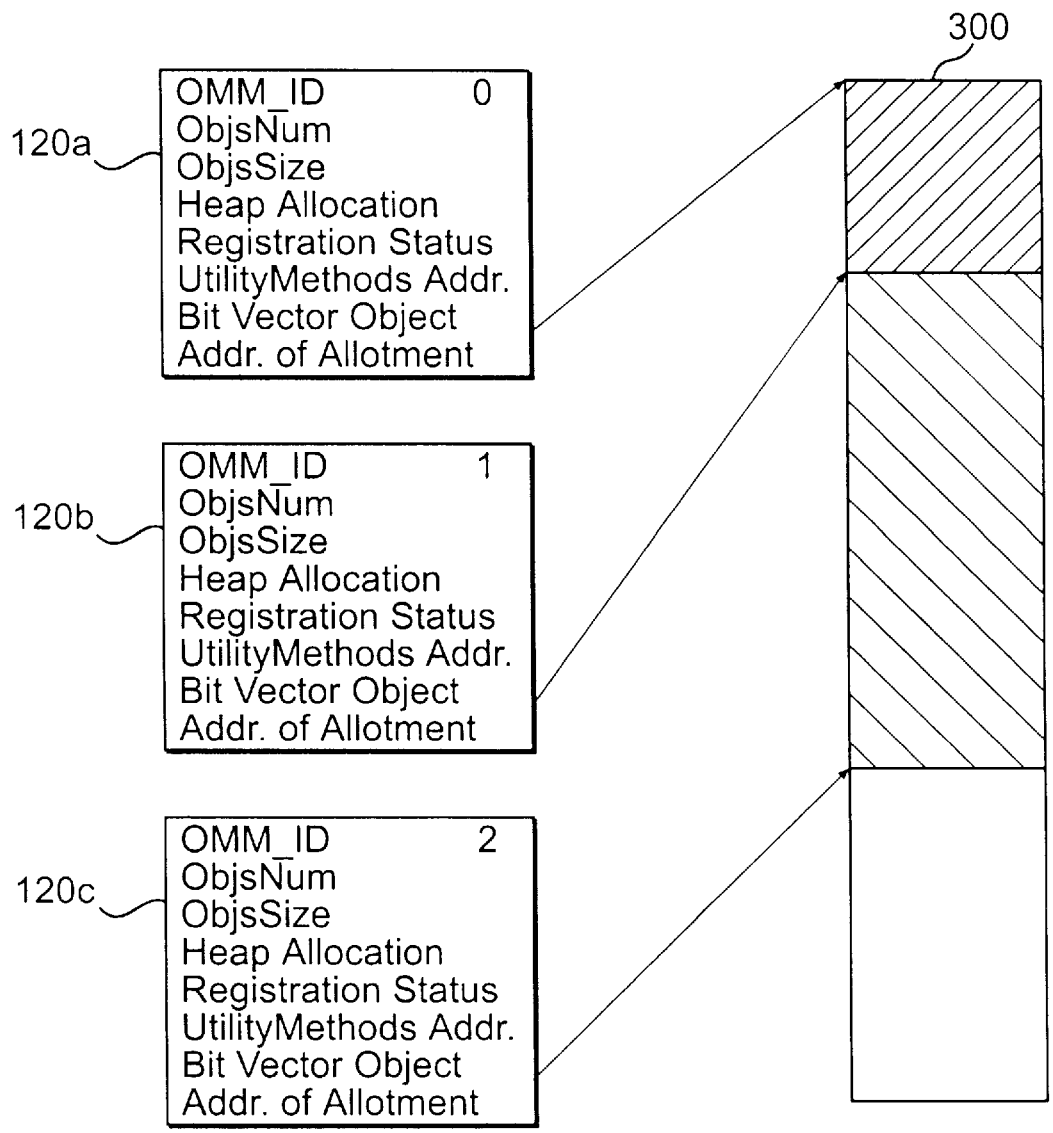
FIG. 3 is a diagram illustrating registrar objects 120 for a plurality of class types 220 registered with OMM system 100 and their relationship to blocks of a system memory 300 allocated to the registered class types 220.

FIG. 3 is a diagram illustrating registrar objects 120a, 120b, and 120c for a plurality of respective class types 220 registered with OMM system 100 and the relationship of registrar objects 120a, 120b, and 120c to portions of a system memory 300. System memory 300 comprises general system memory 140 and object-managed system memory 150. Thus, those blocks of system memory 300 allocated to class types 220 not registering for use of OMM system 100's object management services correspond to general system memory 140, while those blocks of system memory 300 allocated to class types 220 registering for use the object management services correspond to object-managed system memory 150. As shown in FIG. 3, each registrar object 120a, 120b, and 120c contains registration information that memory management unit 130 uses to perform the object management services of OMM system 100. In particular, each registrar object 120a, 120b, and 120c includes the following registration information: (1) the OMM identification value assigned to class type 220 during registration, (2) the number of objects in class type 220; (3) the memory size of each object of class type 220; (4) a heap allocation value; (5) a registration status value; (6) the address of the UtilityMethods member function 226; (7) a bit vector object; and (8) the address of the memory block allocated to class type 220 in system memory 300.

As described above, interface controller unit 110 assigns the OMM identification value to class type 220 during the registration process. The values for the number of objects and the memory size of the objects of class type 220, on the other hand, are provided by registration call request 210. As shown in FIG. 2, registration call request 210 passes as arguments the number and the memory size of the objects of class type 220.

The heap allocation value indicates whether OMM system 100 was able to allocate memory from system memory 300 to class type 220. If not, interface controller unit 110 allocates to class type 220 memory from the system heap outside of that reserved for OMM system 100. By using the heap allocation value to flag the use of memory from the system heap, OMM system 100 can automatically free the system heap memory if OMM system 100 shuts down. The registration status value indicates whether class type 220 registered for the use of the object management services of OMM system 100. In the latter case, registrar object 120a, 120b, and 120c also stores the address of UtilityMethods member function 226. Interface controller unit 110 determines the address of UtilityMethods member function 226 when class type 220 is compiled. Registrar objects 120a, 120b, and 120c also include a bit vector object for indicating whether objects of class type 220 are available for client application 200's use. Upon instantiation, each bit of the bit vector is set to zero but will have a value of one when the object corresponding to that bit is in use.

FIG. 3 further shows that the amount of system memory 300 allocated to each class type 220 is determined according to the registration information provided by client application 200 during registration. OMM systems 100 consistent with the present invention preferably allocate blocks of object memory 130 sequentially as each class type 220 registers with OMM system 100. The final value of registrar objects 120a, 120b, and 120c is the address of the block of system memory 300 allocated to class type 220. FIG. 3 graphically illustrates this address through the arrow drawn from the value for the address of allotment in registrar objects 120a, 120b, and 120c to the start of the corresponding allocated block of system memory 300. For example, FIG. 3 shows that the address of allotment of registrar object 120a is the memory address of the start of the block of system memory 300 allocated to the class type 220 corresponding to registrar object 120a.

Registration

Figure 4:
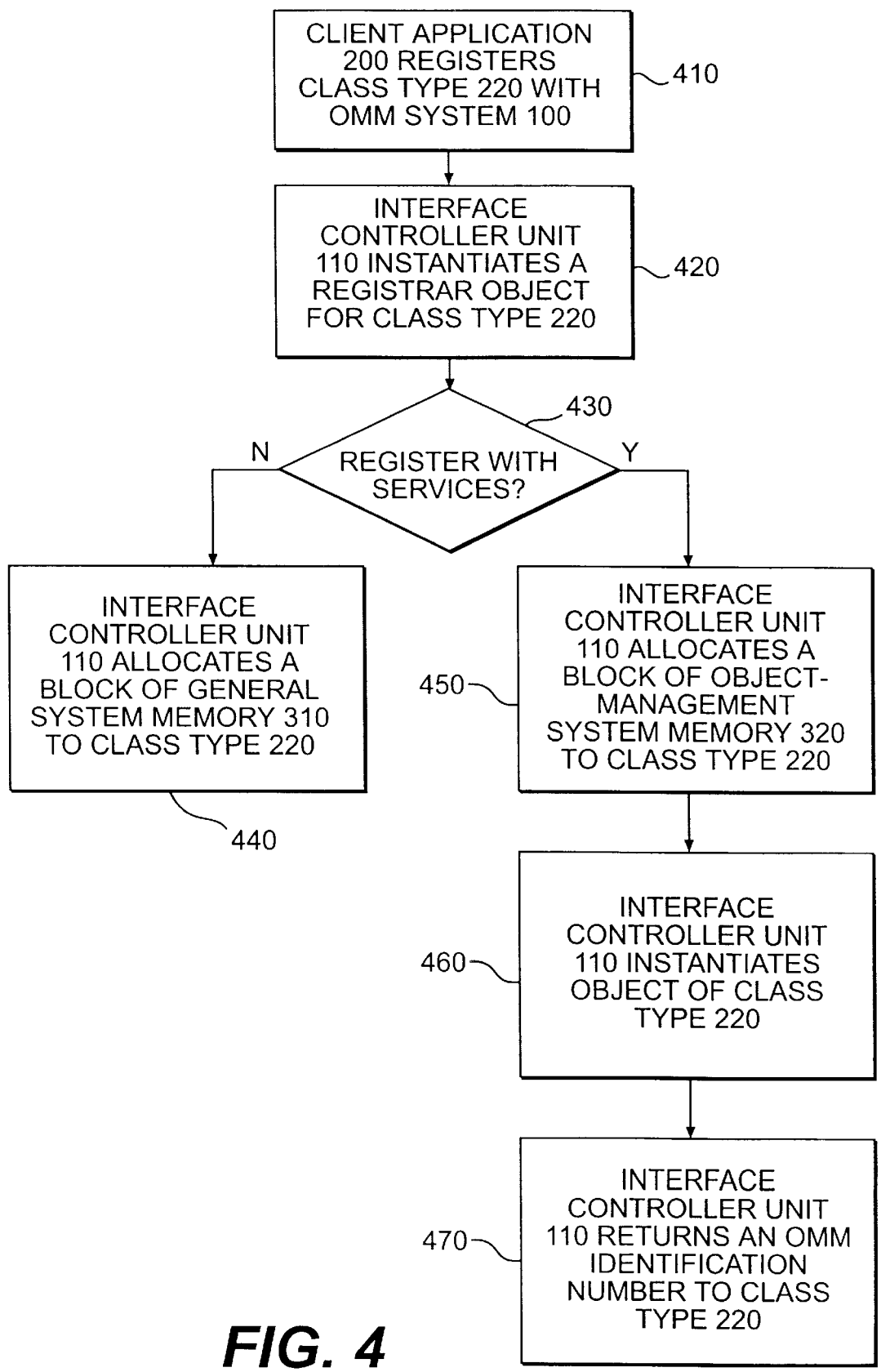
FIG. 4 is a flow diagram of a method consistent with the present invention for registering a class type 220 of client application 200 with OMM system 100.

FIG. 4 is a flow diagram of a method consistent with the present invention for registering a class type 220 of client application 200 with OMM system 100. As shown in FIG. 4, the registration process begins by client application 200 calling a registration function of interface controller unit 110 through registration call request 210 (step 410). Registration call request 210 passes the number of objects of class type 220 and the memory size of those objects to interface controller unit 110.

Interface controller unit 110 then instantiates a registrar object 120 for class type 220 (step 420). As described above, interface controller unit 110 initializes registrar object 120 with the registration information described above with respect to FIG. 3. Specifically, interface controller unit 110 initializes registrar object 120 with an OMM identification number assigned to class type 220, the number and memory size of objects of class type 220, the registration status, and the address of the UtilityMethods member function member 226. The latter four values are provided by registration call request 210, while interface controller unit 110 determines the value of the ONM identification number. Because registration call request 210 does not provide the address of the UtilityMethods member function when registration call request 210 calls the RegisterWithoutServices function, interface controller unit 110 will store a null value in registrar object 120 in place of the UtilityMethods address for this type of registration.

If registration call request 210 calls the RegisterWithoutServices function, interface controller unit 110 will allocate a block of general system memory 140 to class type 220 (steps 430 and 440). Interface controller unit 110 determines the amount of memory to allocate to class type 220 based on the registration information provided by registration call request 210. Specifically, interface controller unit 110 determines the size of the allocated memory block by multiplying the number of objects by the memory size of each object.

If, on the other hand, registration call request 210 calls the RegisterWithServices function, interface controller unit 110 allocates a block of object-managed system memory 150 to class type 220 (steps 430 and 450). Interface controller unit 110 determines the amount of object-managed system memory 150 to allocate to class type 220 in the same manner described above with respect to step 440. For any class type 220 that registers for full use of OMM system 100's object management services, interface controller unit 110 will instantiate the objects of class type 220 in object-managed system memory 150 (step 460).

Interface controller unit 110 then sets in registrar object 120 a pointer to the beginning of the memory block allocated to the objects of class type 220. Interface controller unit 110 also instantiates in registrar object 120 a bit vector object having a bit length equal to the number of objects of class type 220, and sets each of the bits to zero to indicate that each corresponding object is available or not in use. If interface controller unit 110 is unable to secure memory from either system memory 140 or 150, interface controller unit 110 allocates memory from the system heap to class type 220 and sets the heap allocation value to one. Interface controller unit 110 then transmits to class type 220 the OMM identification value assigned to class type 220 (step 470).

Memory Management

Figure 5:
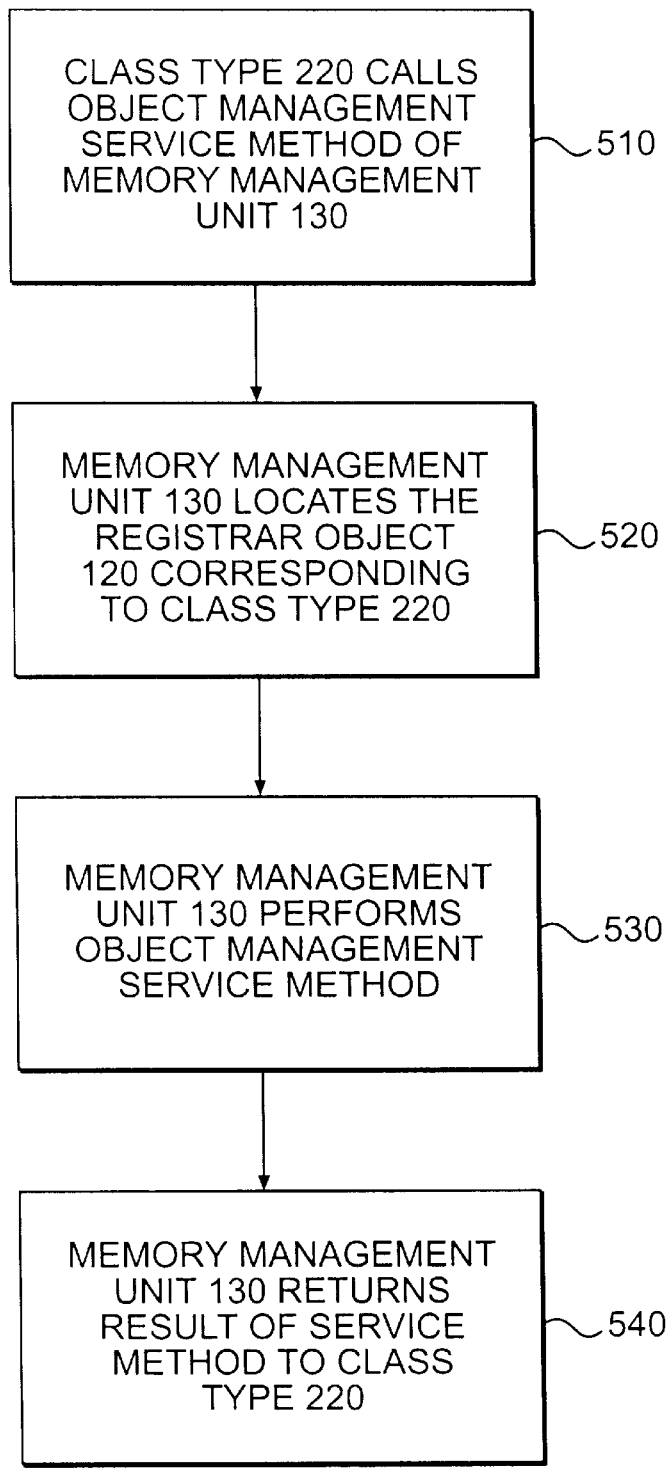
FIG. 5 is a flow diagram of a method consistent with the present invention for requesting object management services of OMM system 100.

Class types 220 that register for use of object managed system memory 150 may utilize object management services of OMM system 100. FIG. 5 is a flow diagram of a method consistent with the present invention for requesting object management services of OMM system 100. As shown in FIG. 5, a class type 220 invokes an object management service by executing service call request 222 (step 510). Service call request 222 calls a specific object management service method stored in memory management unit 130. In addition, although class type 220 typically executes service call request 222, client application 200 may also execute service call request 222. In either case, service call request 222 must include the OMM identification number assigned to class type 220 during the registration process.

When memory management unit 130 receives the message sent by service call request 222, memory management unit 130 will access registrar object 120 corresponding to the OMM identification number included in service call request 222 (step 520). Using the parameters contained in registrar object 120, memory management unit 130 then performs the object management service requested by class type 220 (step 530) and outputs the result of the object management service to class type 220 (step 540). Memory management unit 130 will be able to access an object of class type 220 through the link created by the address of UtilityMethods member function 226 stored in registrar object 120.

Each of the object management services offered by memory management unit 130 operates according to the flow diagram of FIG. 5. For example, when service call request 222 calls the object management service method to release an object of class type 220 from use, service call request 222 will pass to memory management unit 130 the OMM identification number and the memory address of the object requested to be released from use. Memory management unit 130 will then access registrar object 120 corresponding to the OMM identification number sent with service call request 222, and will set to zero the bit of the bit vector object corresponding to the addressed object. Memory management unit 130 then returns a message to class type 220 indicating whether the object management service method succeeded.

When service call request 222 calls the object management service method to obtain the address of an object of class type 220 available for use, service call request 222 passes the OMN identification number to memory management unit 130. Memory management unit 130 will then locate the corresponding registrar object 120 and determine the address of an object that bit vector object indicates available for use. Memory management unit 130 then returns the address of the available object to class type 220.

When service call request 222 calls the object management service method to validate the memory address of an object of class type 220 instantiated in object-managed system memory 150, service call request 222 passes an OMM identification number and the address of an object of class type 220. Memory management unit 130 will then locate the corresponding registrar object 120 and determine the address of the object addressed by service call request 222. Upon comparing the determined address with the address included with service call request 222, memory management unit 130 returns the result of the validation to class type 220.

When service call request 222 calls the object management service method to list the objects of class type 220 currently in use, service call request 222 passes the OMM identification number to memory management unit 130. Memory management unit 130 will then locate the corresponding registrar object 120 and determines the address of those objects that bit vector object indicates are currently in use. Memory management unit 130 then returns the addresses of the in-use objects to class type 220.

When service call request 222 calls the object management service method to obtain an instance number of an object of class type 220 based on the address in object-managed system memory 150 for that object, service call request 222 passes an OMM identification number and the address of an object of class type 220. Memory management unit 130 will then locate the corresponding registrar object 120 and determine the instance number of the object addressed by service call request 222. The instance number is a number assigned to each object of class type 220 when the objects are instantiated in object-managed system memory 150. Memory management unit 130 then returns the instance number of the addressed object to class type 220.

When service call request 222 calls the object management service method to obtain the address in object-managed system memory 150 of an object of class type 220 based on the instance number of that object, service call request 222 passes an OMM identification number and an instance number of an object of class type 220. Memory management unit 130 will then locate the corresponding registrar object 120 and determine the address in object-managed system memory 150 for the object identified by the instance number sent by service call request 222. Memory management unit 130 then returns the instance number of the addressed object to class type 220.

Conclusion

Systems and methods consistent with the invention provide a robust service interface for managing objects and memory resources for instantiating objects in an object-oriented program controlled system.

It will be apparent to those skilled in the art that various modifications and variations can be made to the systems and methods consistent with the present invention without departing from the spirit or scope of the invention. The present invention covers the modifications and variations of this invention provided they come within the scope of the appended claims and their equivalents.

What is claimed is:

1. An object memory management system that communicates with a client application, the system comprising:
   means for receiving registration information from the client application, the registration information describing a memory requirement of an object of a class type of the client application;
   means for allocating memory to the class type according to the registration information received from the client application; and
   means for managing the object of the class type using the allocated memory.

2. The system of claim 1, wherein the means for receiving receives registration information for a plurality of objects, and wherein the receiving means further includes
   means for receiving from the client application registration information defining the number of objects of the class type and the memory size of the objects of the class type.

3. The system of claim 1, wherein the system communicates with a plurality of client applications, and wherein the means for receiving registration information further includes
   means for receiving registration information from the plurality of client applications.

4. The system of claim 1, wherein the means for receiving registration information further includes
   means for assigning an identification number to the class type.

5. The system of claim 4, further including
   means for receiving a service call request from the client application; and
   wherein the means for managing further includes means for managing the object of the class type according to the service call request.

6. The system of claim 5, wherein the means for receiving a service call request further includes
   means for receiving a service call request that includes the identification number of the class type.

7. The system of claim 1, wherein the means for receiving registration information further includes
   means for instantiating a registrar object initialized with the registration information describing the object of the class type.

8. The system of claim 7, wherein the means for instantiating a registrar object further includes
   means for initializing the registrar object with an address of a member function of the client application.

9. The system of claim 7, wherein the means for managing objects further includes
   means for locating a registrar object corresponding to the class type; and
   means for managing the object of the class type according to the registration information included in the located registrar object.

10. The system of claim 9, wherein the means for receiving registration information further includes
    means for assigning an identification number to the class type.

11. The system of claim 10, wherein the means for locating the registrar object further includes
    means for locating a registrar object corresponding to the identification number assigned to the class type.

12. The system of claim 1, wherein the means for allocating memory further includes
    means for allocating to the client application memory from one of a general system memory and an object-managed system memory.

13. The system of claim 12, wherein the means for managing further includes
    means for allowing the client application to access object management services of the object management system when memory from the object-managed system memory is allocated to the client application.

14. The system of claim 1, wherein the means for allocating memory further includes
    means for determining the amount of memory to allocate to the client application based upon the registration information.

15. The system of claim 1, wherein the means for allocating memory further includes means for instantiating the object of the class type using the allocated memory.

16. The system of claim 1, wherein the means for allocating memory further includes
   means for allocating a block of system memory to the class type according to the registration information received from the client application;
   means for determining when the allocated system memory exceeds a memory limit of the object memory management system; and
   means for allocating, to the client application, memory from a second memory source outside of the system memory.

17. The system of claim 1, wherein the means for managing further includes
   means for releasing an object of the class type from use by the client application.

18. The system of claim 1, wherein the means for managing further includes
   means for obtaining an address of an object of the class type that is available for use by the client application.

19. The system of claim 1, wherein the means for managing further includes
   means for validating a memory address of the object of the class type.

20. The system of claim 1, wherein the means for managing further includes
   means for listing objects of the class type that are being used by the client application.

21. The system of claim 1, wherein the means for managing further includes
   means for obtaining an instance number of the object of the class type based on a memory address for the object.

22. The system of claim 1, wherein the means for managing further includes
   means for obtaining a memory address of the object of the class type based on an instance number of the object.

23. The system of claim 1, further including
   means for receiving a service call request from the client application.

24. The system of claim 23, wherein the means for receiving a service call request further includes
   means for receiving a service call request that includes the identification number of the class type.

25. A method for managing an object memory for a client application, the method comprising the steps of:
   receiving registration information from the client application, the registration information describing a memory requirement of an object of a class type of the client application;
   allocating memory to the class type according to the registration information received from the client application; and
   managing the object of the class type using the allocated memory.

26. The method of claim 25, wherein the step of receiving receives registration information for a plurality of obiects, and wherein the receiving step further includes the substep of
   receiving, from the client application, registration information defining the number of objects of the class type and the memory size of the objects of the class type.

27. The method of claim 25, wherein the step of receiving registration information includes the substep of
   receiving registration information from a plurality of client applications.

28. The method of claim 25, wherein the step of receiving registration information includes the substep of
   means for assigning an identification number to the class type.

29. The method of claim 28, further including the steps of receiving a service call request from the client application; and
   wherein the managing step further includes the substep of managing the object of the class type according to the service call request.

30. The method of claim 29, wherein the step of receiving a service call request further includes the substep of
   receiving a service call request that includes the identification number of the class type.

31. The method of claim 25, wherein the step of receiving registration information further includes the substep of
   instantiating a registrar object initialized with the registration information describing the object of the class type.

32. The method of claim 31, wherein the step of instantiating a registrar object further includes the substep of
   initializing the registrar object with an address of a member function of the client application.

33. The method of claim 31, wherein the step of managing objects further includes the substeps of
   locating a registrar object corresponding to the class type; and
   managing the object of the class type according to the registration information included in the located registrar object.

34. The method of claim 33, wherein the step of receiving registration information further includes the substep of
   assigning an identification number to the class type.

35. The method of claim 34, wherein the step of locating the registrar object further includes the substep of
   locating a registrar object corresponding to the identification number assigned to the class type.

36. The method of claim 25, wherein the step of allocating memory further includes the substep of
   allocating, to the client application, memory from one of a general system memory and an object-managed system memory.

37. The method of claim 36, wherein the step of managing further includes the substep of
   allowing the client application to access object management services of the object management system when memory from the object-managed system memory is allocated to the client application.

38. The method of claim 25, wherein the step of allocating memory further includes the substep of
   determining the amount of memory to allocate to the client application based upon the registration information.

39. The method of claim 25, wherein the step of allocating memory further includes the substep of
   instantiating the object of the class type using the allocated memory.

40. The method of claim 25, wherein step of allocating memory further includes the substep of
   allocating a block of system memory to the class type according to the registration information received from the client application;
   determining when the allocated system memory exceeds a memory limit of the object memory management system; and allocating, to the client application, memory from a second memory source outside of the system memory.

41. The method of claim 25, wherein the step of managing further includes the substep of releasing an object of the class type from use by the client application.

42. The method of claim 25, wherein the step of managing further includes the substep of obtaining an address of an object of the class type that is available for use by the client application.

43. The method of claim 25, wherein the step of managing further includes the substep of validating a memory address of the object of the class type.

44. The method of claim 25, wherein the step of managing further includes the substep of listing objects of the class type that are being used by the client application.

45. The method of claim 25, wherein the step of managing further includes the substep of obtaining an instance number of the object of the class type based on a memory address for the object.

46. The method of claim 25, wherein the step of managing further includes the substep of obtaining a memory address of the object of the class type based on an instance number of the object.

47. The method of claim 25, further including the step of receiving a service call request from the client application.

48. The method of claim 47, wherein the step of receiving a service call request further includes the substep of receiving a service call request that includes the identification number of the class type.

49. A computer for managing memory, the computer, which communicates with a client application, comprising:

a memory having program instructions; and a processor, responsive to the programming instructions, configured to:

receive registration information from the client application, the registration information describing a memory requirement of an object of a class type of the client application;

allocate memory to the class type according to the registration information received from the client application; and manage the object of the class type using the allocated memory.

50. The computer of claim 49, wherein the processor receives registration information for a plurality of objects, and wherein the processor is further configured to receive from the client application registration information defining the number of objects of the class type and the memory size of the objects of the class type.

51. The computer of claim 49, wherein the computer communicates with a plurality of client applications, and wherein the processor is further configured to receive registration information from the plurality of client applications.

52. The computer of claim 49, wherein the processor is further configured to assign an identification number to the class type.

53. The computer of claim 52, wherein the processor is further configured to receive a service call request from the client application; and manage the object of the class type according to the service call request.

54. The computer of claim 53, wherein the processor is further configured to receive a service call request that includes the identification number of the class type.

55. The computer of claim 49, wherein the processor is further configured to instantiate a registrar object initialized with the registration information describing the object of the class type.

56. The computer of claim 55, wherein the processor is further configured to initialize the registrar object with an address of a member function of the client application.

57. The computer of claim 55, wherein the processor is further configured to locate a registrar object corresponding to the class type; and manage the object of the class type according to the registration information included in the located registrar object.

58. The computer of claim 57, wherein the processor is further configured to assign an identification number to the class type.

59. The computer of claim 58, wherein the processor is further configured to locate a registrar object corresponding to the identification number assigned to the class type.

60. The computer of claim 49, wherein the processor is further configured to allocate to the client application memory from one of a general system memory and an object-managed system memory.

61. The computer of claim 49, wherein the processor is further configured to allow the client application to access object management services of the object management system when memory from the object-managed system memory is allocated to the client application.

62. The computer of claim 49, wherein the processor is further configured to determine the amount of memory to allocate to the client application based upon the registration information.

63. The computer of claim 49, wherein the processor is further configured to instantiate the object of the class type using the allocated memory.

64. The computer of claim 49, wherein the processor is further configured to allocate a block of system memory to the class type according to the registration information received from the client application;

determine when the allocated system memory exceeds a memory limit of the computer; and allocate, to the client application, memory from a second memory source outside of the computer memory.

65. The computer of claim 49, wherein the processor is further configured to release an object of the class type from use by the client application.

66. The computer of claim 49, wherein the processor is further configured to obtain an address of an object of the class type that is available for use by the client application.

67. The computer of claim 49, wherein the processor is further configured to validate a memory address of the object of the class type.

68. The computer of claim 49, wherein the processor is further configured to list objects of the class type that are being used by the client application.

69. The computer of claim 49, wherein the processor is further configured to obtain an instance number of the object of the class type based on a memory address for the object.

70. The computer of claim 49, wherein the processor is further configured to obtain a memory address of the object of the class type based on an instance number of the object.

71. The computer of claim 49, wherein the processor is further configured to receive a service call request from the client application.

72. The computer of claim 71, wherein the processor is further configured to receive a service call request that includes the identification number of the class type.

* * * * *